United States Patent
Lund et al.

(10) Patent No.: US 9,686,490 B2
(45) Date of Patent: Jun. 20, 2017

(54) INTEGRATING PIXELS AND METHODS OF OPERATION

(71) Applicant: Sensors Unlimited, Inc., Princeton, NJ (US)

(72) Inventors: Joshua Lund, Dallas, TX (US); Patrick Kuschak, Brooklyn, NY (US); Minlong Lin, Plainsboro, NJ (US); Robert Brubaker, Freehold, NJ (US)

(73) Assignee: Sensors Unlimited, Inc., Princeton, NJ (US)

( * ) Notice: Subject to any disclaimer, the term of this patent is extended or adjusted under 35 U.S.C. 154(b) by 0 days.

(21) Appl. No.: 14/242,597

(22) Filed: Apr. 1, 2014

(65) Prior Publication Data

US 2015/0281612 A1    Oct. 1, 2015

(51) Int. Cl.
| | |
|---|---|
| *H04N 5/359* | (2011.01) |
| *H04N 5/3745* | (2011.01) |
| *H04N 5/355* | (2011.01) |
| *H04N 5/374* | (2011.01) |

(52) U.S. Cl.
CPC ........... *H04N 5/359* (2013.01); *H04N 5/3559* (2013.01); *H04N 5/35527* (2013.01); *H04N 5/374* (2013.01); *H04N 5/3745* (2013.01); *H04N 5/37452* (2013.01)

(58) Field of Classification Search
None
See application file for complete search history.

(56) References Cited

U.S. PATENT DOCUMENTS

| | | | |
|---|---|---|---|
| 6,246,436 B1* | 6/2001 | Lin | G01J 1/46 257/E27.132 |
| 7,825,966 B2 | 11/2010 | Manabe et al. | |
| 2005/0224843 A1* | 10/2005 | Boemler | H01L 27/14603 257/233 |
| 2009/0225210 A1* | 9/2009 | Sugawa | H01L 27/14603 348/308 |
| 2013/0076910 A1* | 3/2013 | Scott | H04N 5/332 348/164 |
| 2013/0194472 A1 | 8/2013 | Takeda | |
| 2014/0252239 A1* | 9/2014 | Nguyen | H04N 5/32 250/366 |
| 2014/0291488 A1* | 10/2014 | Laforce | 250/214 LA |

(Continued)

OTHER PUBLICATIONS

Akahane, Nana, et al. "Optimum design of conversion gain and full well capacity in CMOS image sensor with lateral overflow integration capacitor" IEEE Transactions on Electron Devices, vol. 56, No. 11, Nov. 11, 2009, pp. 2429-2435.*

(Continued)

*Primary Examiner* — Erik Kielin
(74) *Attorney, Agent, or Firm* — Locke Lord LLP; Scott D. Wofsy; Joshua L. Jones

(57) ABSTRACT

A pixel cell includes a first integration capacitor, a second integration capacitor, a photo detector and a transistor. The first integration capacitor includes a first lead operatively coupled to the photo detector. The second integration capacitor includes a first lead. The transistor is operatively coupled between the leads of the first and second integration capacitors for enabling current flow between the photo detector and the second integration capacitor only once a threshold voltage is met on the first integration capacitor.

12 Claims, 4 Drawing Sheets

(56) References Cited

U.S. PATENT DOCUMENTS

2015/0022267 A1* 1/2015 Wurcer .......................... 330/257
2015/0085988 A1* 3/2015 Mollov .......................... 378/114
2015/0189199 A1* 7/2015 Borremans et al. ... H04N 5/359

OTHER PUBLICATIONS

Yao, Libin; "CMOS Readout Circuit Design for Infrared Image Sensors," Department of Electrical and Computer Engineering, National University of Singapore; International Symposium on Photoelectronic Detection and Imaging 2009: Advances in Imaging Detectors and Applications, edited by Kun Zhang, Xiang-jun Wang, Guang-jun Zhang, Ke-cong Ai, Proc. of SPIE vol. 7384, 73841B; © 2009 SPIE CCC code: 0277-786X/09; dor 10.1117/12.835520; Proc. of SPIE vol. 7384 73841B-1.
Belgium Search Report for Belgium Application No. 201505205, dated Feb. 29, 2016.

* cited by examiner

INTEGRATING PIXELS AND METHODS OF OPERATION

BACKGROUND OF THE INVENTION

1. Field of the Invention

The subject invention relates to image sensor circuitry, and more particularly, to pixel cells, e.g. for a sensor array in an imager.

2. Description of Related Art

Many imaging technologies use integrating pixels, which accumulate photocurrent generated in a photo detector, e.g. a photodiode, to charge an integration capacitor. The amount of signal that the pixel can sense before saturation is referred to as well capacity, and is proportional to the physical value of the integration capacitor. The sensitivity of an integrating pixel (or conversion gain) is also related to the capacitance value of the integration capacitor, but is inversely proportional. Generally, it is desired to have both high sensitivity and large well capacity, but these pixel performance parameters are typically in direct competition.

Traditional integrating pixels have addressed this problem by having multiple modes of operation, e.g. one mode for high sensitivity and one mode for large well capacity. This is typically accomplished by using a small integration capacitor for the high sensitivity mode and enabling a switch to connect an additional, larger integration capacitor to activate the large well capacity mode. This switch is generally implemented by a transistor or transistors that are operated in binary ON or OFF modes. Moreover, sensor architectures are generally designed such that all pixels in an array are being controlled homogenously, so all pixels operate only in high sensitivity mode or high capacity mode.

Traditional integrating pixels have limited imaging quality, in part, due to the trade-off between sensitivity and large well capacity. There is a need in the art for integrating pixels with increased imaging quality. The present disclosure provides a solution for this need.

SUMMARY OF THE INVENTION

A pixel cell includes a first integration capacitor, a second integration capacitor, a photo detector and a transistor. The first integration capacitor includes a first lead operatively coupled to the photo detector. The second integration capacitor includes a first lead. The transistor is operatively coupled between the leads of the first and second integration capacitors for enabling current flow between the photo detector and the second integration capacitor only once a threshold voltage is met on the first integration capacitor.

In accordance with certain embodiments the second integration capacitor has a greater capacitance than the first integration capacitor. The pixel cell can also include a current mirror operatively coupled between the photo detector and the capacitors. The transistor can be an NMOS device and/or a PMOS device. The pixel cell can also include a second transistor operatively coupled between the photo detector and the first integration capacitor. The photo detector can be a photo diode.

The first and second integration capacitors can be operatively coupled in series or in parallel with respect to a signal current path. The pixel cell can also include a voltage reset and an input amplifier. The voltage reset can be operatively coupled to the first integration capacitor. The input amplifier can be operatively coupled between the photo detector and a current mirror. Each of the first and second integration capacitors can be grounded, and wherein the current mirror can be operatively coupled to bias voltage sources.

A method for dual-gain pixel cell integration of photocurrent includes receiving an electrical signal from a photo detector into a first integration capacitor when a voltage on a first integration capacitor is within a first voltage range, and receiving the electrical signal from the photo detector into the first integration capacitor and a second integration capacitor when the voltage on the first integration capacitor is within a second voltage range. The first voltage range is between a reset voltage and a threshold voltage. Pixel sensitivity and well capacity within the first voltage range are functions of the first integration capacitor value. Pixel sensitivity and well capacity within the second voltage range are functions of the sum of the first and second integration capacitor values. The first voltage range can be greater than the reset voltage. The second voltage range can be greater or equal to the threshold voltage. The first voltage range can be less than a reset voltage. The second voltage range can be less than or equal to the threshold voltage.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
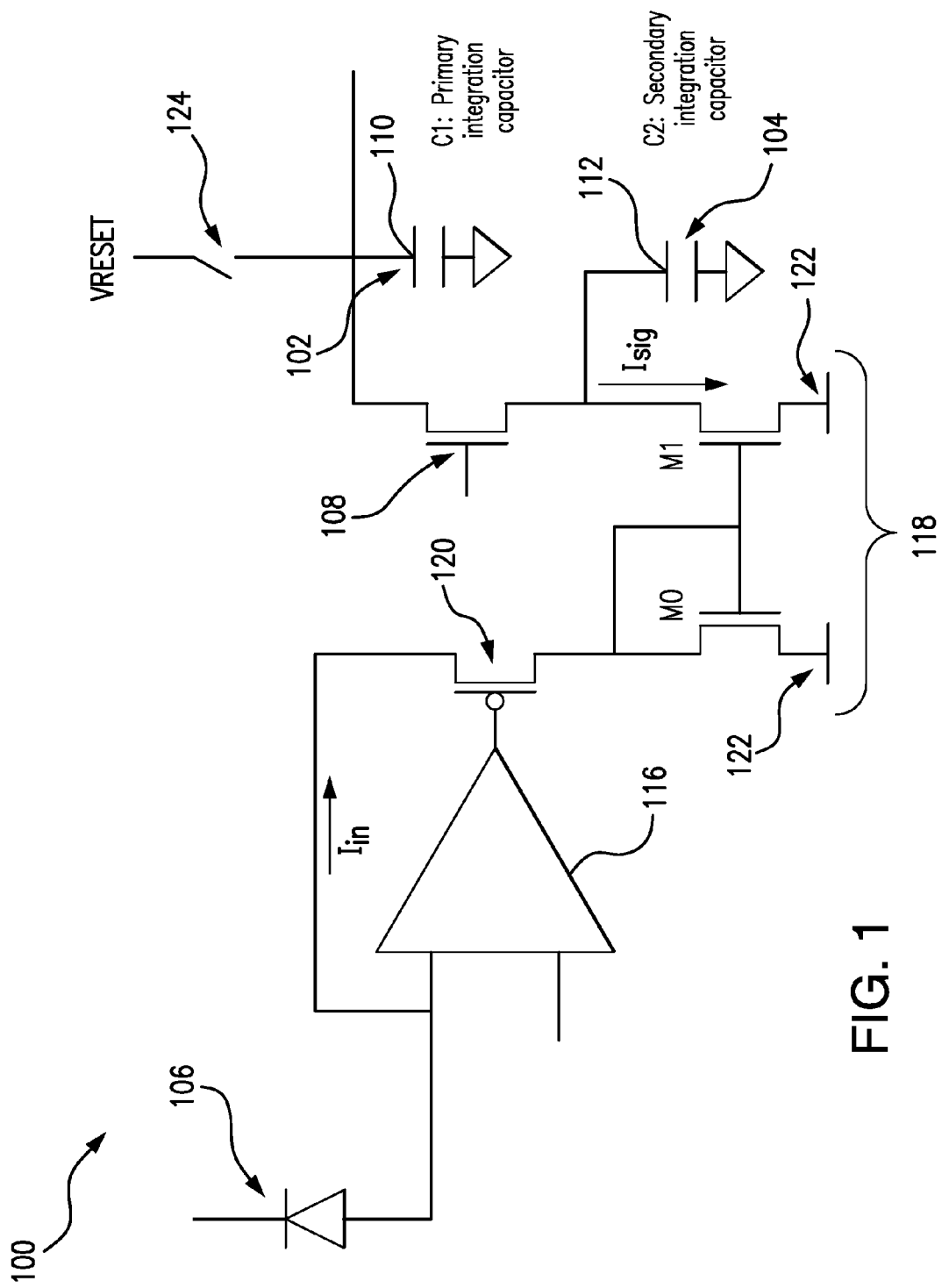
FIG. 1 is a schematic view of an exemplary embodiment of an integrating pixel cell constructed in accordance with the present invention, showing the first and second integration capacitors arranged in series with respect to the current signal, with a current mirror operative coupled between a photo detector and the capacitors.

Reference will now be made to the drawings wherein like reference numerals identify similar structural features or aspects of the subject disclosure. For purposes of explanation and illustration, and not limitation, a partial view of an exemplary embodiment of an integrating pixel cell in accordance with the disclosure is shown in FIG. 1 and is designated generally by reference character 100. Other embodiments of integrating pixel cells in accordance with the disclosure, or aspects thereof, are provided in FIGS. 2-4, as will be described. The systems and methods described herein provide for an integrating pixel with an operation mode wherein each pixel in an array can operate in both a high sensitivity mode and a high well capacity mode during the same exposure.

As shown in FIG. 1, a pixel cell 100 includes a first integration capacitor 102, a second integration capacitor 104, a photo detector 106, e.g. a photodiode, and an NMOS transistor 108. First integration capacitor 102 includes a first lead 110 operatively coupled to collect a charge from photo detector 106. Second integration capacitor 104 includes a first lead 112. Transistor 108 is operatively coupled between the leads 110 and 112 of the first and second integration capacitors 102 and 104, respectively, for enabling photocurrent flow between photo detector 106 and second integration capacitor 104 only once a threshold voltage $V_{threshold}$ is met on first integration capacitor 102. Second integration capacitor 104 has a greater capacitance than first integration capacitor 102.

Threshold voltage $V_{threshold}$, as shown in FIG. 1, is governed by the following equation:

$$V_{threshold} = V_{knee} - |V_{thn}|$$

wherein $V_{knee}$ is a voltage representing the gate voltage of transistor 108 that is provided by a source and $V_{thn}$ is a voltage representing the NMOS threshold voltage of transistor 108. Those skilled in the art will readily appreciate that threshold voltage $V_{threshold}$ can be adjusted by adjusting $V_{knee}$ of transistor 108.

With continued reference to FIG. 1, first and second integration capacitors 102 and 104, respectively, are operatively coupled in series with respect to a current path for electrical signal $I_{sig}$. Pixel cell 100 includes a second PMOS transistor 120 operatively coupled between photo detector 106 and first integration capacitor 102. Pixel cell 100 also includes a current mirror 118 operatively coupled between photo detector 106 and the capacitors 102 and 104. Pixel cell 100 includes an input amplifier 116. Input amplifier 116 is operatively coupled between photo detector 106 and current mirror 118. M0 and M1 of current mirror 118 are operatively coupled to respective bias voltage sources 122 used to control current mirror 118 and to synchronize an input photocurrent $I_{in}$ and mirrored photocurrent $I_{sig}$. A voltage reset 124 is operatively coupled to first integration capacitor 102. Voltage reset 124 functions to set a voltage $V_{int1}$ on the first integration capacitor 102 back to a reset voltage $V_{reset}$. Each of the first and second integration capacitors 102 and 104, respectively, are terminated to a ground net.

Photo detector 106 generates input photocurrent $I_{in}$. Second transistor 120 is coupled to and passes the photocurrent $I_{in}$ from photo detector 106. Second transistor 120 is coupled to current mirror 118. Current mirror 118 is configured to reproduce an electrical signal $I_{sig}$ proportional to $I_{in}$. Current mirror 118 is operatively coupled to second integration capacitor 104 and to transistor 108. Transistor 108 controls the discharge of first and second integration capacitors 102 and 104, respectively.

Figure 4:
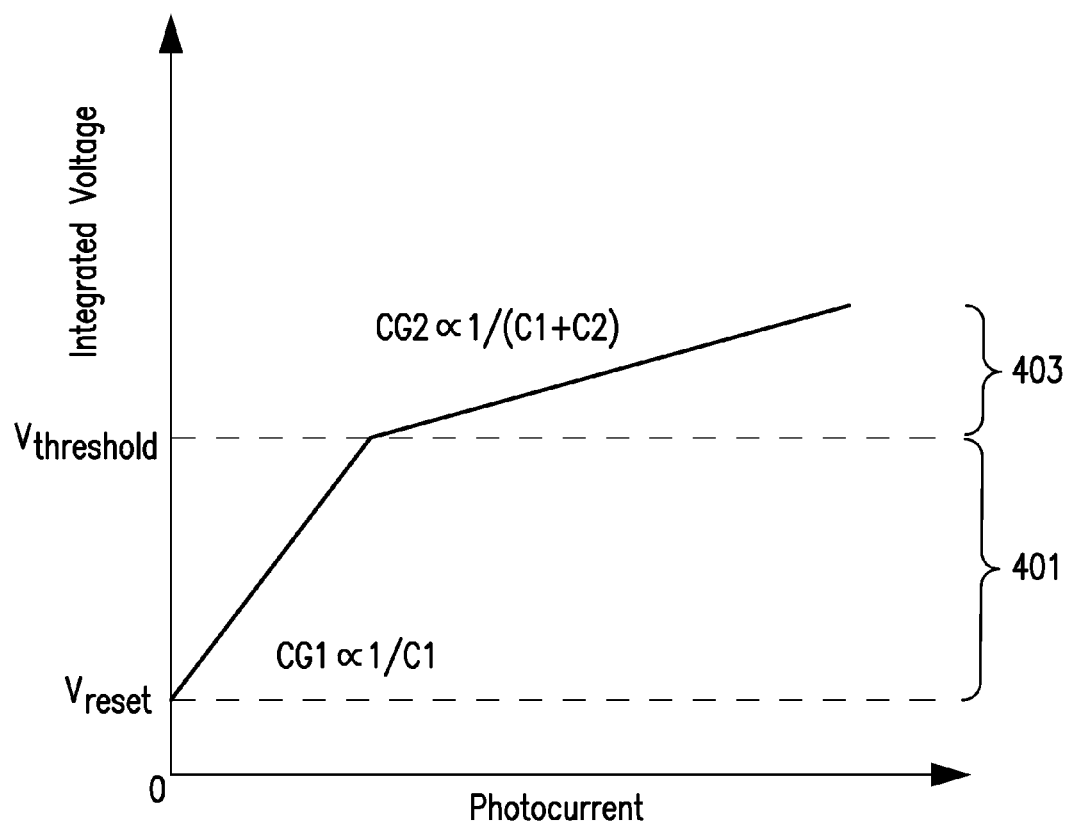
FIG. 4 is a graph of integrated voltage versus photocurrent for the integrating pixel cell of FIG. 2.

First and second integration capacitors 102 and 104, respectively, function to convert electrical signal $I_{sig}$ from photo detector 106 into a voltage, e.g. similar to the integrated voltage, shown in FIG. 4, described below. FIG. 1 shows pixel cell 100 integrating from high voltage to low voltage, while the chart of FIG. 4 is representative of a pixel cell 200 integrating from low voltage to high voltage. Those skilled in the art will readily appreciate that a chart representative of integrated voltage versus photocurrent for pixel cell 100 would be similar to chart shown in FIG. 4 except that $V_{reset}$ would be greater than $V_{threshold}$.

It is contemplated that during initial exposure, e.g. equivalent to voltage above $V_{threshold}$, when high well capacity is not required, transistor 108 only allows for current to flow from first integration capacitor 102, e.g. the smaller integration capacitor. During conditions with enough light for electrical signal $I_{sig}$ to reach a threshold, e.g. equivalent to $V_{threshold}$ in first integration capacitor 102, current flows from first integration capacitor 102 and from second integration capacitor 104, e.g. a larger integration capacitor, providing both high sensitivity from first integration capacitor 102, and high well capacity from second integration capacitor 104 during the same exposure period to an individual pixel. Those skilled in the art will readily appreciate that this results in an image with reduced noise at the high well capacity level as compared with an imager using traditional integrating pixels. This can also allow for improved short-wave infrared (SWIR) imaging.

Those skilled in the art will also readily appreciate that embodiments of this invention provide for self-adjusting, adaptive control to allow for large well capacity at strong light and low well capacity at weak light, which can generate large dynamic range otherwise difficult to achieve by using just a single either small or large integration capacitor. Further, those skilled in the art will also readily appreciate that pixel conversion gains in each pixel adapt independently as $V_{threshold}$ level is achieved in each individual pixel, in contrast to traditional pixels where the mode is uniform for the entire sensor array. This tends to extend the dynamic range of the integrating pixel as compared with traditional integrating pixels. Further, while pixel cells are described with respect to FIG. 1 as integrating from high voltage to low voltage, those skilled in the art will readily appreciate that pixel cells can also integrate from low voltage to high voltage, as will be described below with respect to FIG. 2, e.g. $V_{threshold}$ can be achieved in either direction depending on whether the controlling transistor is an NMOS or PMOS transistor.

Figure 2:
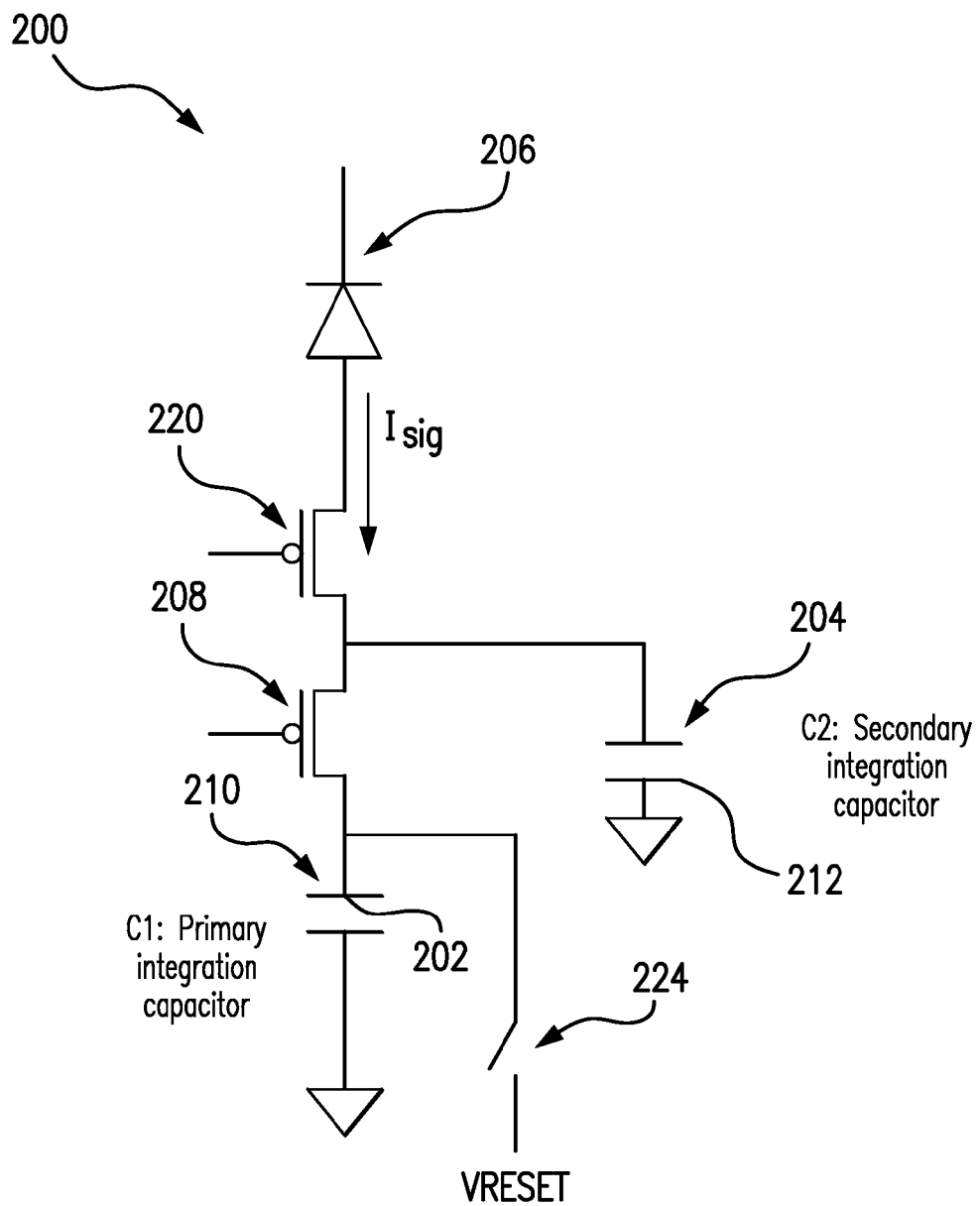
FIG. 2 is a schematic view of an exemplary embodiment of an integrating pixel cell constructed in accordance with the present invention, showing the first and second integration capacitors arranged in series with respect to the current signal.

With reference now to FIG. 2, pixel cell 200 is similar to pixel cell 100. Pixel cell 200 includes a transistor 208 that is a PMOS transistor. Pixel cell 200 integrates from low voltage to high voltage, e.g. at a voltage below $V_{threshold}$ transistor 208 only allows for current to flow to first integration capacitor 202, and, from $V_{threshold}$ and above, current flows to first integration capacitor 202 and to second integration capacitor 204. Those skilled in the art will readily appreciate that this provides similar advantages to those described above with respect to FIG. 1. Further, pixel cell 200 does not include a current mirror, e.g. current mirror 118, or an input amplifier, e.g. input amplifier 116. Those skilled in the art will readily appreciate that, because there is no current mirror, $I_{sig}$ is the same as $I_{in}$ described above. It is contemplated that the current mirror and/or the amplifier are optional components. Those skilled in the art will also readily appreciate that pixel cell 200 can be used in a variety of suitable integrating pixels.

Threshold voltage $V_{threshold}$, as shown in FIG. 2, is governed by the following equation:

$$V_{threshold} = V_{knee} + |V_{thp}|$$

wherein $V_{knee}$ is a voltage representing the gate voltage of transistor 208 that is provided by a source and $V_{thp}$ is a voltage representing the PMOS threshold voltage of transistor 208. Those skilled in the art will readily appreciate that threshold voltage $V_{threshold}$ can be adjusted by adjusting $V_{knee}$ of transistor 208.

Figure 3:
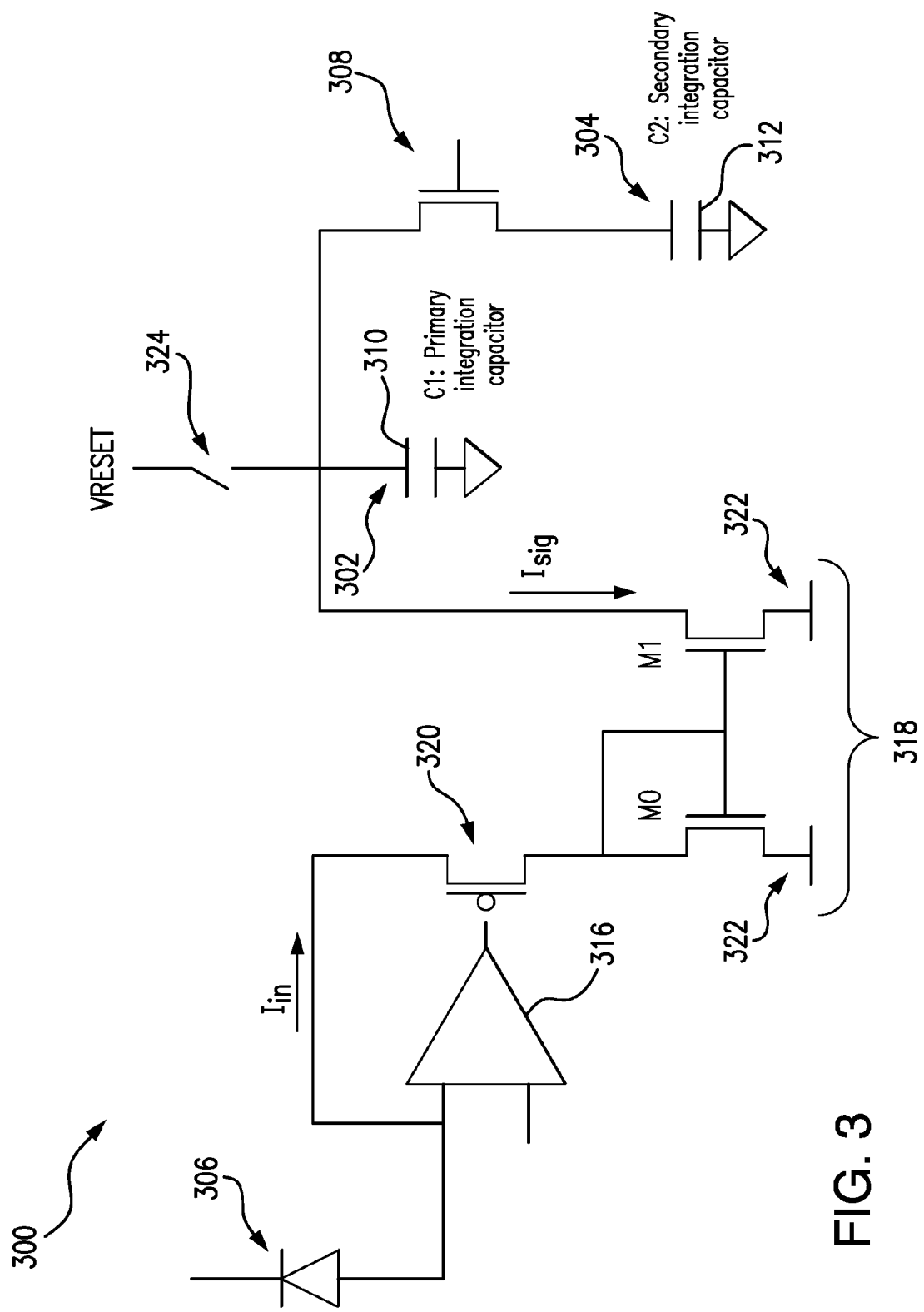
FIG. 3 is a schematic view of an exemplary embodiment of an integrating pixel cell constructed in accordance with the present invention, showing the first and second integration capacitors arranged in parallel with respect to the current signal.

As shown in FIG. 3, pixel cell 300 is similar to pixel cell 100. In pixel cell 300, first and second integration capacitors 302 and 304, respectively, are arranged in parallel relative to electrical signal $I_{sig}$ current path. Those skilled in the art will readily appreciate that first and second integration capacitors 102 and 104 can be arranged in either series, as shown in FIG. 1, or in parallel as shown in FIG. 3.

Now with reference to FIGS. 1-4, a method for dual-gain pixel cell, e.g. pixel cells 100, 200 and 300, integration of photocurrent includes receiving an electrical signal $I_{sig}$ into a first integration capacitor, e.g. first integration capacitors 102, 202 and 302, when a voltage $V_{int1}$ on the first integration capacitor is within a first voltage range, e.g. first voltage range 401. The first voltage range is between reset voltage $V_{reset}$ and threshold voltage $V_{threshold}$. Within the first voltage range, pixel sensitivity, e.g. a first conversion gain, and a first well capacity are governed by the following equations:

$$CG1 \propto \frac{1}{C1}$$
$$WC1 \propto C1$$

wherein CG1 is the first conversion gain, WC1 is the first well capacity and C1 is the value of the first integration capacitor.

When $V_{int1}$ is within a second voltage range, e.g. a second voltage range 403, electrical signal $I_{sig}$ from the photo detector is received into the first integration capacitor and a second integration capacitor, e.g. second integration capacitors 104, 204 and 304, resulting in an integrated voltage $V_{int1,2}$ that is a function of both first and second integration capacitors. With respect to FIGS. 1 and 3, e.g. pixel cells 100 and 300, the second voltage range is less than or equal to $V_{threshold}$. With respect to FIGS. 2 and 4, e.g. pixel cell 200, the second voltage range is greater or equal to threshold voltage $V_{threshold}$. Within the second voltage range, pixel sensitivity, e.g. a second conversion gain, and a second well capacity are governed by the following equations:

$$CG2 \propto \frac{1}{(C1+C2)}$$
$$WC2 \propto (C1+C2)$$

wherein CG2 is the second conversion gain, WC2 is the second well capacity, C1 is the value of the first integration capacitor, and C2 is the value of the second integration capacitor.

In accordance with the equations above, a voltage response of pixel cell 200 is shown in FIG. 4. The voltage on first integration capacitor 202 gets reset to $V_{reset}$, therefore the integrated voltage begins at $V_{reset}$ and as the photocurrent, e.g. electrical signal $I_{sig}$, is present over time, the integrated voltage increases. Between $V_{reset}$ and $V_{threshold}$, integrated voltage and current gain are functions of first integration capacitor 202, e.g. photocharge will accumulate on first integration capacitor 202. The voltage on second integration capacitor 204 is reset to $V_{knee}+V_{thp}$, which equates to $V_{threshold}$ as described above. Therefore, when the integrated voltage meets or exceeds $V_{threshold}$, integrated voltage and current gain are functions of both first and second integration capacitors 202 and 204, respectively, e.g. incremental photocharge will accumulate on both first and second integration capacitors 202 and 204, respectively. Those skilled in the art will readily appreciate that $V_{threshold}$ between the two conversion gains can be adjusted by adjusting $V_{knee}$ of PMOS transistor 208 or by adjusting a PMOS threshold voltage $V_{thp}$ of a PMOS transistor 220.

The methods and systems of the present disclosure, as described above and shown in the drawings, provide for photo detectors with superior properties including improved image quality. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A pixel cell comprising:
a first integration capacitor with a first lead thereof operatively coupled to a photo detector;
a reset switch connected to a reset voltage, the reset switch being directly coupled to the first integration capacitor and uncoupled to the photo detector;
a second integration capacitor with a first lead operatively coupled in series with respect to the current path for the electrical signal output by the photo detector; and
a transistor receiving a gate voltage input at its gate, the transistor being operatively coupled between the leads of the first and second integration capacitors,
wherein the transistor is positioned so that at least one of current generated at the photo detector and current proportional to the current generated at the photo detector that reaches the first integration capacitor must pass through the transistor,
and
wherein, the transistor controls current flow to the first and second integration capacitors causing an integration voltage of the pixel cell to change from being a function of only the first integration capacitor to being a function of both the first and second integration capacitors.

2. A pixel cell as recited in claim 1, wherein the second integration capacitor has a greater capacitance than the first integration capacitor.

3. A pixel cell as recited in claim 1, further comprising a current mirror operatively coupled between the photo detector and the capacitors.

4. A pixel cell as recited in claim 1, wherein the transistor is at least one of an NMOS device and a PMOS device.

5. A pixel cell as recited in claim 1, further comprising a second transistor operatively coupled between the photo detector and the first integration capacitor.

6. A pixel cell as recited in claim 1, wherein the photo detector is a photo diode.

7. A pixel cell as recited in claim 1, wherein the first and second integration capacitors are operatively coupled in series with respect to a signal current path for an electrical signal output by the photo detector.

8. A pixel cell as recited in claim 7, further comprising an input amplifier operatively coupled between the photo detector and a current mirror, wherein each of the first and second integration capacitors has a second lead connected directly to ground, and wherein the current mirror is operatively coupled to bias voltage sources.

9. A pixel cell as recited in claim 1, wherein integration voltage of the pixel cell changes continuously when current transitions from flowing through the first integration capacitor to flowing through both of the first and second integration capacitors, the transition being in response to increased accumulation of photo current output by the photo detector.

10. A pixel cell as recited in claim 1, wherein the threshold voltage is proportional to a gate voltage input at the gate of the transistor and is constant throughout an exposure of the photo detector.

11. A pixel cell as recited in claim 1, wherein the second integration capacitor is coupled to a terminal of the transistor and is configured to have a reset voltage equal to a threshold voltage that is a function of the gate voltage and is different than the reset voltage, the second integration capacitor being reset when an integration voltage of the pixel cell reaches the threshold voltage.

12. A pixel cell as recited in claim 11, wherein an integration voltage of the pixel cell is within a first voltage range before the second integration capacitor is reset, and the integration voltage of the pixel cell is within a second voltage range once the second integration capacitor is reset, the integration voltage being a function of only the first integration capacitor while in the first voltage range, and a function of both the first and second integration capacitors while in the second voltage range.

* * * * *